Figure 1:
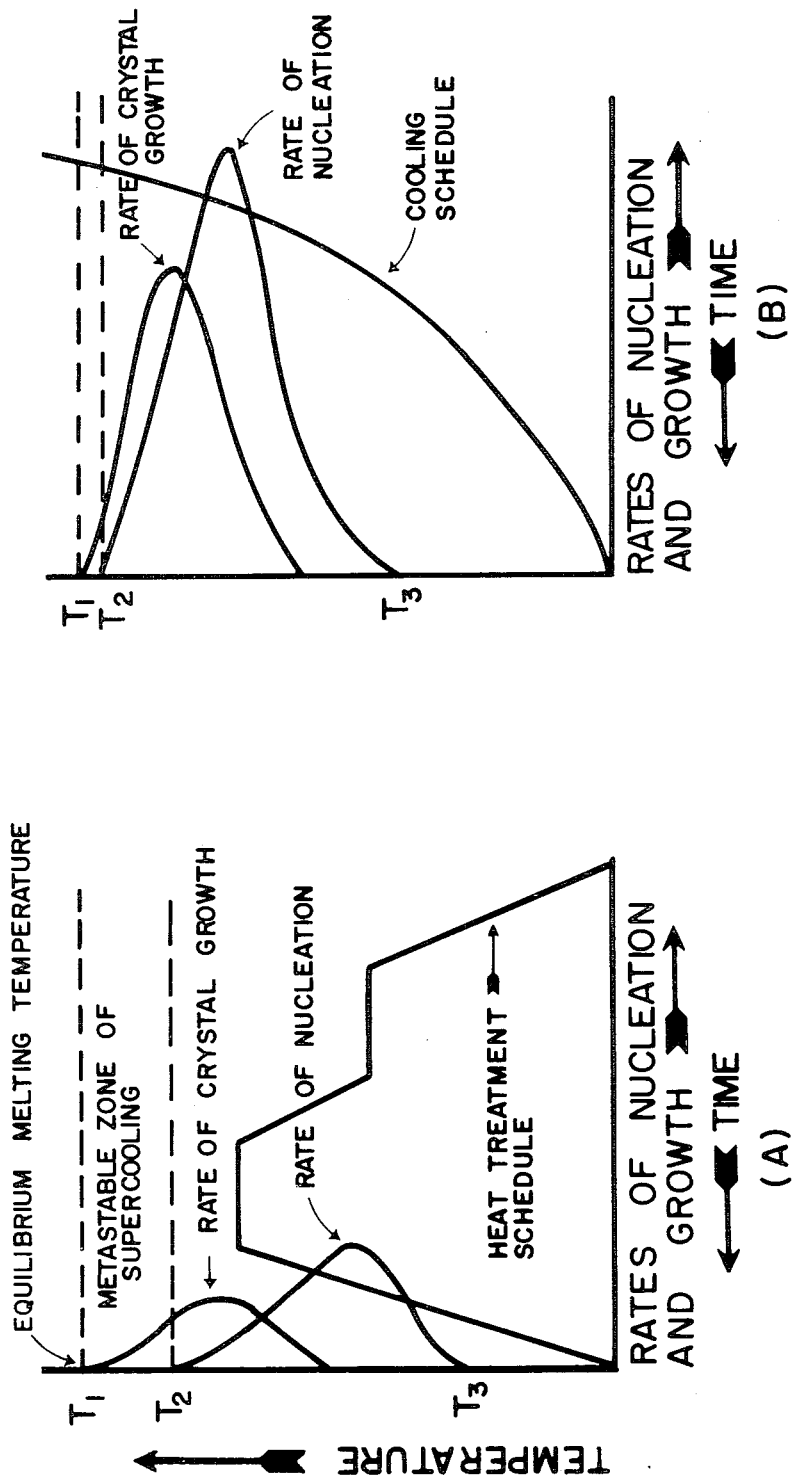

United States Patent [19]

Grossman

[11] 4,244,723

[45] Jan. 13, 1981

[54] SPONTANEOUSLY-FORMED MULLITE GLASS-CERAMICS

[75] Inventor: David G. Grossman, Corning, N.Y.

[73] Assignee: Corning Glass Works, Corning, N.Y.

[21] Appl. No.: 559,789

[22] Filed: Mar. 19, 1975

[51] Int. Cl.³ ............... C03B 27/00; C03B 32/00; C03C 3/22

[52] U.S. Cl. ............................. 65/33; 65/114

[58] Field of Search ........................... 65/33, 114

[56] References Cited

U.S. PATENT DOCUMENTS

| | | | |
|---|---|---|---|
| 3,690,855 | 9/1972 | Schultz | 65/33 |
| 3,726,695 | 4/1973 | Beall et al. | 65/33 |
| 3,741,861 | 6/1973 | Andrieu | 65/33 |
| 3,801,295 | 4/1974 | Beall et al. | 65/33 |
| 3,804,608 | 4/1974 | Gaskell et al. | 65/33 |
| 3,846,101 | 11/1974 | Gaskell et al. | 65/33 |
| 3,985,531 | 10/1976 | Grossman | 65/33 |

*Primary Examiner*—Richard V. Fisher
*Attorney, Agent, or Firm*—Clinton S. Janes, Jr.; Clarence R. Patty, Jr.

[57] ABSTRACT

The present invention is concerned with the fabrication of articles demonstrating the highly-crystalline, fine-grained internal microstructure of conventional glass-ceramic bodies, but which can be formed spontaneously from a molten glass. Thus, the present articles are not produced by heat treating a glass body at elevated temperatures to cause crystallization in situ as is required in the customary manufacture of glass-ceramic articles. More specifically, this invention relates to the fabrication of glass-ceramic articles from compositions within the $MgO$-$Al_2O_3$-$B_2O_3$-$SiO_2$-F field utilizing $TiO_2$ as a nucleating agent, wherein mullite comprises the principal crystal phase, and which can be formed spontaneously from a molten glass.

6 Claims, 2 Drawing Figures

RATES OF NUCLEATION AND GROWTH WITHIN (A) CONVENTIONAL AND (B) SPONTANEOUSLY FORMED GLASS-CERAMIC SYSTEMS (A)

(B)

SPONTANEOUSLY-FORMED MULLITE GLASS-CERAMICS

U.S. applications Ser. Nos. 559,725 (now U.S. Pat. No. 3,985,531) and 559,787, filed concurrently herewith by the present applicant, and U.S. application Ser. No. 559,732 (now U.S. Pat. No. 3,985,534), filed concurrently herewith by J. E. Flannery and D. R. Wexell, disclose the manufacture of spontaneously-formed glass-ceramic articles wherein a fluormica constitutes the primary crystal phase. U.S. applications Ser. Nos. 559,727 (now U.S. Pat. No. 3,985,533) and 559,726, (now U.S. Pat. No. 3,985,532) also filed concurrently herewith by the present applicant, disclose the fabrication of spontaneously-formed glass-ceramic bodies wherein beta-spodumene solid solution and celsian, respectively, comprises the predominant crystal phase. U.S. application Ser. Nos. 559,731 (now U.S. Pat. No. 3,989,496) and 559,730, (now U.S. Pat. No. 4,000,998), also filed concurrently herewith by H. L. Rittler, describe the production of spontaneously-formed glass-ceramic articles wherein BaO and/or $SrO-Fe_2O_3-SiO_2$ solid solution and carnegieite and/or nepheline solid solution, respectively, constitutes the principal crystal phase. U.S. application Ser. No. 559,786, filed concurrently herewith by G. H. Beall, discusses the formation of spontaneously-formed glass-ceramic articles wherein alpha-quartz solid solution comprises the predominant crystal phases. U.S. application Ser. No. 559,788, filed concurrently herewith by G. H. Beall, P. E. Blaszyk, and W. T. Brydges, III, discloses the manufacture of spontaneously-formed glass-ceramic articles wherein beta-spodumene solid solution constitutes the primary crystal phase.

U.S. Pat. No. 2,920,971 founded the basis for the field of glass-ceramics. As disclosed therein, the fabrication of glass-ceramic articles involves the controlled heat treatment of a parent or precursor glass body at elevated temperatures. Hence, the conventional method for making glass-ceramic articles contemplates three general steps. First, a glass-forming batch, normally containing a nucleating agent, is melted. Second, this melt is cooled to at least within and, more commonly, below the transformation range to yield an essentially crystal-free glass and, at the same time, an article of a desired geometry is shaped therefrom. Thereafter, this glass shape is heated to a temperature above the transformation range thereof to cause the growth of crystals in situ. [The transformation range has been delineated as comprising the temperature at which a molten mass is converted into an amorphous solid, and has generally been defined as lying in the vicinity of the annealing point of a glass.]

In common practice, the third or crystallization step is divided into two processes. Thus, in the first step, the precursor glass body will be heated to a temperature slightly above the transformation range and will be held at such temperature for a length of time sufficient to secure substantial nucleation. Afterwards, the nucleated body is raised to a still higher temperature, frequently above the softening point of the precursor glass, and maintained thereat for an adequate period of time to cause the growth of crystals on the nuclei.

Because of this careful heat treatment of the parent glass body, a homogeneously-crystallized article is formed wherein the crystals are relatively uniformly fine-grained. However, for a more detailed discussion of the theoretical concepts and practical considerations involved in the structure and manufacture of glass-ceramic articles, reference is again made to U.S. Pat. No. 2,920,971, supra.

During the cooling and forming of molten batches into glass bodies, it has frequently been observed that crystallization will occur, the crystals beginning at the surface or at the interface between the molten batch and a forming element and growing inwardly into the glass body. This phenomenon has been termed "normal" devitrification and is commonly regarded as undesirable since the resultant microstructure is composed of non-uniformly sized, relatively coarse-grained crystals which are usually oriented in a plane normal to the surface. This type of microstructure customarily results in a mechanically-weak body.

The mechanism of that devitrification process differs fundamentally from that prevailing in the production of glass-ceramic articles because it involves crystallization taking place at temperatures approaching or concomitant with the liquidus of the molten batch. A further example of crystallization occurring at or near the liquidus temperature can be found in the fusion casting of refractory ceramic materials. Contrary to those processes, the manufacture of glass-ceramic articles by means of the controlled heat treatment of parent glass bodies contemplates temperatures considerably below the liquidus, thereby providing a larger degree of supercooling, such that the development of crystals takes place in the glass at a much higher viscosity level which permits time to play an important role in crystal growth.

The primary objective of the present invention is the fabrication of spontaneously-formed glass-ceramic articles. These articles exhibit physical properties and internal microstructures akin to those inherent to classic glass-ceramic bodies. However, the articles of the instant invention can be produced by simply cooling a glass-forming melt of a particular composition to a solid body, i.e., no subsequent heat treatment of the body is required to achieve the desired fine-grained crystallization. Hence, certain compositions within the $MgO-Al_2O_3-B_2O_3-SiO_2-TiO_2-F$ field, when cooled from a melt, can yield bodies consisting essentially of uniformly fine-grained crystals homogeneously dispersed within a glassy matrix. Thus, the solid bodies, without any further heat treatment, will be highly crystalline, i.e., greater than 50% by volume crystalline, and the crystals, themselves, will have diameters less than about five microns with the majority being less than one micron.

FIG. 1 graphically depicts the differences in crystallization mechanism existing between the spontaneously-produced glass-ceramic articles of the present invention and conventional glass-ceramic articles. The most vital element is believed to be the overlap observed in the rate curves for nucleation and crystallization shown therein. Thus, as can be seen, below the equilibrium melting temperature of the viscous liquid $T_1$, there is a temperature range ($T_1-T_2$) wherein nuclei do not form at a perceptible rate. This temperature interval has been denominated the metastable zone of supercooling. With conventional glass-ceramic compositions, no crystals develop at or just below the metastable zone because the nucleation rate thereat is so very low that growth sites for crystals are not provided. Hence, nucleation takes place within the $T_2-T_3$ temperature range.

The crystallization mechanism prevailing in the manufacture of conventional glass-ceramic articles is illustrated in FIG. 1(A). Thus, crystallization is obtained by first reheating the supercooled liquid, i.e., the parent glass article, into the region of maximum nucleation, maintaining that temperature for a sufficient length of time to attain the substantial development of nuclei, and thereafter raising the temperature of the nucleated body into the range of maximum crystal growth and holding thereat for a period of time adequate to secure the desired crystal growth.

The crystallization mechanism underlying the production of the spontaneously-formed glass-ceramic articles of the instant invention is graphically expressed in FIG. 1(B). It is quite apparent that the metastable region of supercooling is considerably narrower and the rates of nucleation and crystal growth much more rapid. As a result of these factors, nucleation and crystallization can occur at such a rapid rate immediately below the zone of metastable supercooling that hold periods of any consequence within those respective temperature regions are not required. In such circumstances the simple cooling of the melt will provide a body having uniformly fine-grained crystals dispersed within a glassy matrix. It will be immediately apparent, however, that severe quenching of the molten batch could cool the mass at such a rapid rate through the respective zones of nucleation and crystallization that the desired glass-ceramic article would not be produced.

U.S. Pat. No. 3,804,608 discloses a number of compositions operable in making glass-ceramic bodies without employing the reheating step required in the production of conventional glass-ceramic bodies, but no reference is made therein to compositions within the MgO-Al$_2$O$_3$-B$_2$O$_3$-SiO$_2$-TiO$_2$-F field of the instant invention. Furthermore, although fluorine is noted as an optical ingredient in several of the compositions cited, there is no statement as to any utility therefor. Therefore, the discovery of its utility in reducing the temperature at which the desired crystallization of the present invention will occur was certainly not recognized.

Compositions operable in the present invention consist essentially, expressed in weight percent on the oxide basis as calculated from the batch, of about 5–15% MgO, 15–35% Al$_2$O$_3$, 1–5% B$_2$O$_3$, 30–55% SiO$_2$, 8–15% TiO$_2$, and 5–15% F. While their presence is not required, the additions of As$_2$O$_5$ in amounts up to about 2%, CaO in amounts up to about 5%, and Na$_2$O and/or K$_2$O in amounts up to 5% can be useful. Thus, the presence of a combination of As$_2$O$_5$, B$_2$O$_3$, CaO, and Na$_2$O in the mole ratio of 1As$_2$O$_5$, 4B$_2$O$_3$, 3CaO, and 3Na$_2$O appears to be helpful in promoting uniform crystallization as the molten batch is cooled. As$_2$O$_5$ has the further function of maintaining the TiO$_2$ in an oxidized state, thereby insuring that the crystallized article will exhibit a white appearance. This is especially important with the present compositions since very substantial quantities of TiO$_2$ are demanded to achieve the desired high crystallinity. B$_2$O$_3$, with the optional pressure of Na$_2$O and/or K$_2$O, acts to stabilize the residual glass and to inhibit rapid and uncontrolled crystal growth. Fluorine retention during melting was determined to be about 60%, according to chemical analyses of the final product. The presence of fluorine appears to permit the crystallinity to occur at lower temperatures.

Minor additions of various compatible metal oxides can be tolerated but are not encouraged. Thus, the preferred products will consist solely of the above-recited components with the total of all extraneous additions being maintained at a level below about 5% by weight. Such possible additions can include ZnO, SrO, BaO, and PbO. Li$_2$O will desirably be absent since its presence can lead to the formation of crystal phases other than mullite. ZrO$_2$ may function as a secondary nucleating agent but the inclusion of more than a few percent hazards the presence of ZrO$_2$ crystals in the crystallized product. P$_2$O$_5$ is commonly avoided because of its tendency to simply increase the amount of the residual glassy matrix.

In general, the preferred composition ranges of ingredients to secure the most uniformly fine-grained glass-ceramic bodies containing mullite (3Al$_2$O$_3$.2SiO$_2$) as the primary crystal phase with a minor amount of rutile (TiO$_2$) consist essentially of about 6–12% MgO, 18–25% Al$_2$O$_3$, 2–4% B$_2$O$_3$, 35–50% SiO$_2$, 10–12% TiO$_2$, and 8–12% F.

Table I records a number of glass compositions, expressed in weight percent on the oxide basis as calculated from the batch, operable in the present invention. Inasmuch as it is not known with which cation(s) the fluorine is combined, it is merely reported as fluoride (F) and the oxygen$\approx$fluorine correction factor tabulated in accordance with conventional glass analysis practice. The actual batch ingredients can comprise any materials, either the oxide or other compound, which, upon being melted together, will be converted into the desired oxide in the proper position. In the compositions listed, AlF$_3$ provided the fluoride content.

The batch ingredients were ballmilled together to aid in obtaining a homogeneous melt and then placed into a platinum crucible. After covering, the crucible was positioned within an electrically-fired furnace operating at 1550° C. and maintained at that temperature for about six hours. The melt was very fluid exhibiting a viscosity of only about 3–4 poises at that temperature. Thereafter, the melt was poured into a graphite or steel mold to form a slab about 6"×6"×½". The slab was permitted to cool in the ambient atmosphere to about 750°–850° C., as measured by means of an optical pyrometer, this cooling being completed in about 60 seconds. The slab was then transferred to an annealer operating at 750°–850° C., depending upon the composition of the batch.

During the cooling step, the molten glass seems to stiffen in the normal manner until a temperature of about 1000° C., as determined by an optical pyrometer, is reached. At or somewhat below that temperature, a hazy opalization occurs at the edges of the slab and moves toward the center thereof. This is quickly followed by a wave of opaque crystallization. The presence of B$_2$O$_3$ with or without Na$_2$O and/or K$_2$O helps in alleviating possible warping or other adverse physical effects during the rapid crystallization.

It has been found that this prior opalization is demanded in order to attain the desired uniformly fine-grained crysallization. FIG. 1(B) can be instructive in understanding the reason for this. Hence, to provide for fine-grained crystallization during the cooling of the melt, there must be a very high degree of nucleation at temperatures at or about the optimum growth temperature. This opalization, occurring at about 100°–300° C. above the annealing point of the glass, supplies the demanded nucleation. Nevertheless, whereas spontaneous opalization occurs in numerous glasses, unless one of the amorphous phases involved in the opalization is at least partially unstable as a glass and crystalline nuclei of some kind are precipitated, there will be no spontaneous crystallization of the major glass components. In the instant composition field, TiO$_2$ is believed to be concentrated in one of the amorphous opal phases since, in the absence of TiO$_2$, neither opalization nor spontaneous crystallization is observed. Furthermore, the tendency for titanium to increase its coordination from 4 to 6 during the cooling of aluminosilicate glasses, resulting in fine phase separation, is well-known. This lends further credence to the theory regarding the action of TiO$_2$ in the present glasses.

The mechanism promoting the very rapid and spontaneous growth of mullite crystals upon the titanate nuclei is not fully appreciated. However, it is believed that crystallites are developed at temperatures well above the annealing point of the glass during or immediately after the opalization phenomenon which furnish available nuclei while the glass is still within the temperature range for maximum crystal growth. Fluorine appears to function as a mineralizer, i.e., it acts to accelerate crystal development.

TABLE I

|                | 1     | 2     | 3     | 4     | 5     | 6     | 7     | 9     |
|----------------|-------|-------|-------|-------|-------|-------|-------|-------|
| SiO$_2$        | 37.7  | 35.5  | 37.5  | 38.1  | 44.7  | 50.4  | 44.7  | 39.2  |
| Al$_2$O$_3$    | 25.7  | 30.2  | 24.2  | 24.6  | 19.5  | 19.0  | 23.0  | 25.3  |
| MgO            | 10.1  | 8.6   | 12.0  | 10.9  | 10.6  | 5.6   | 6.4   | 12.6  |
| F              | 11.4  | 9.8   | 10.8  | 11.0  | 8.8   | 8.5   | 10.3  | 11.3  |
| As$_2$O$_5$    | 0.8   | 0.8   | 0.8   | 0.8   | 0.8   | 0.8   | 0.8   | 0.4   |
| B$_2$O$_3$     | 3.2   | 3.2   | 3.2   | 3.2   | 3.2   | 3.2   | 3.2   | 3.3   |
| TiO$_2$        | 11.2  | 11.2  | 11.2  | 11.2  | 11.2  | 11.2  | 11.2  | 11.7  |
| CaO            | 2.4   | 2.4   | 2.4   | 2.4   | 2.4   | 2.4   | 2.4   | —     |
| Na$_2$O        | 2.4   | 2.4   | 2.4   | 2.4   | 2.4   | 2.4   | 2.4   | 0.8   |
|                | 104.9 | 104.1 | 104.5 | 104.6 | 103.6 | 103.5 | 104.4 | 104.6 |
| O ≈ F          | -4.9  | -4.1  | -4.5  | -4.6  | -3.6  | -3.5  | -4.4  | -4.6  |
|                | 100.0 | 100.0 | 100.0 | 100.0 | 100.0 | 100.0 | 100.0 | 100.0 |

Table II provides a summary of the physical appearance, the internal microstructure, and the physical properties determined after the slabs had been removed from the annealer. Thus, a visual description of the slab exterior and a fracture surface is reported along with the crystal phases making up the article as identified through X-ray diffraction analyses. The coefficients of thermal expansion ($\times 10^{-7}/°$ C.) over the temperature ranges of 25°–500° C. and 25°–900° C. and the moduli of rupture (psi) are also recorded as determined in accordance with standard measuring techniques. In general, the coefficient of expansion over the range 25°–500° C. will vary between about $45$–$65 \times 10^{-7}/°$ C. and between about $90$–$105 \times 10^{-7}/°$ C. over the range 25°–900° C. Moduli of rupture values will commonly vary between about 10,000–15,000 psi.

Figure 2:

FIG. 2, a replica electron micrograph of the spontaneously-formed slab of Example 8, is illustrative of the characteristic microstructure of the desired highly crystalline products. The white bar at the base of the micrograph represents a distance of one micron. The large majority of the needle-shaped crystals are mullite with a minor amount of rutile. The micrograph indicates the crystals to have diameters less than one micron and the total crystallinity exceeds 50% by volume.

TABLE II

| Example No. | Visual Description | Crystal Phases | Expansion Coefficient 25°–500° C. | Expansion Coefficient 25°–900° C. | Modulus of rupture |
|---|---|---|---|---|---|
| 1 | Very fine-grained smooth, shiny fracture, gray-white body | Mullite, rutile | 63.5 | 92.5 | 13,100 |
| 2 | Very fine-grained, smooth, shiny fracture, gray-white body | Mullite, rutile | 60.4 | 92.0 | 9,860 |
| 3 | Very fine-grained, smooth, shiny fracture, gray-white body | Mullite, rutile | 72.9 | 94.1 | 14,200 |
| 4 | Fine-grained, dull to shiny fracture, white body | Mullite, rutile | 58.3 | 90.2 | 14,200 |
| 5 | Fine-grained, dull to shiny fracture, white body | Mullite, rutile | 62.5 | 101.5 | 10,900 |
| 6 | Fine-grained, smooth fracture, white body | Mullite, rutile | 48.1 | — | — |
| 7 | Fine-grained, smooth fracture, white body | Mullite, rutile | 64.8 | — | — |
| 8 | Fine to medium grained, rough fracture, white body | Mullite, rutile | 62.3 | — | 14,800 |

The four general steps comprising the method of the invention are believed to be quite apparent from the above description. First, a glass-forming batch having a composition within the above-defined operable ranges is melted. Second, this molten batch is simultaneously cooled to a temperature about 100°–300° C. above the annealing point of the glass to secure phase separation and nucleation and a glass body shaped therefrom. Third, the glass body is exposed to a temperature between the annealing point of the glass and the temperature of phase separation and nucleation for a period of time sufficient to cause crystallization of mullite and rutile. Fourth, the crystallized body is cooled to room temperature.

It has been stressed above that the second or phase separation step is of vital importance to the successful operation of the invention. Hence, the rate of cooling the molten batch must not be so rapid that the necessary phase separation and nucleation do not have time to take place. Laboratory experience has taught that, with the compositions of the instant invention, cooling rates between about 10°–1000° C./minute yield satisfactory phase separation and nucleation. These phenomena have generally been observed to occur at temperatures between about 850°–1000° C.

Because the compositions of this invention crystallize very rapidly after phase separation and nucleation have occurred, exposure times within the crystallization range of as brief as two minutes may be adequate to achieve high crystallinity, i.e. greater than about 50% by volume of the body and, frequently, in excess of 75% by volume. Crystallization will commonly take place at temperatures between about 650°–850° C. However, as was illustrated above in the specific examples, ease in production has suggested that the glass body, after phase separation and nucleation have occurred, be placed into an annealer operating at a temperature within or slightly above the crystallization interval and cooled to room temperature therein.

Annealing techniques customary in the glassmaking art can likewise be successfully employed here. Hence, annealing times as brief as 0.5 hour can be adequate with certain compositions, but the more common practice contemplates periods of two hours or more. However, utilizing a very long annealing schedule does not appear to substantially improve the physical properties or internal microstructure of the final product, so that practice is not favored from an economic point of view.

Although the preferred practice of the invention involves crystallizing the article as the phase separated and nucleated glass body is cooled to room temperature, it is quite possible to cool the melt to room temperature at such a rapid rate that phase separation and nucleation will take place, but the desired fine-grained crystallization of mullite and rutile will not occur, so that the final body is essentially glassy. Nonetheless, fine-grained crystallization of that glassy body can be accomplished by exposing it to a temperature within the crystallization range in like manner to that described above with respect to the crystallization obtained when the melt is cooled to room temperature. Hence, again, it is the occurrence of phase separation and nucleation at temperatures above the crystallization interval which is of critical import to the operability of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz., exposing the crystallized article to a blast of cold air to chill it to room temperature, is the preferred technique due to ease of practice and relative low cost, but immersion in various liquids such as oils and salt baths can also be operable.

The mechanism acting to provide this improvement in mechanical strength has not been fully explained, but is believed to be founded in the small amount of residual glass which is considered to be present as a continuous phase throughout the crystallized body. This hypothesis is believed to find support in FIG. 2 wherein the residual glass is seen as small depressed regions due to its greater solubility in the etchant utilized to prepare the replica electron micrograph.

I claim:

1. A method for making a highly crystalline glass-ceramic article consisting essentially of mullite and rutile crystals homogeneously dispersed within a glassy matrix, said crystals constituting at least 50% by volume of said article, which comprises the steps of:
   (a) melting a batch for a glass consisting essentially, by weight on the oxide basis as calculated from the batch, of about 5–15% MgO, 15–35% $Al_2O_3$, 1–5% $B_2O_3$, 30–55% $SiO_2$, 8–15% $TiO_2$, and 5–15% F;
   (b) simultaneously cooling said melt to a temperature about 850°–1000° C. and shaping a glass body therefrom at a rate between about 10°–1000° C./minute to obtain phase separation and nucleation therein;
   (c) further cooling said shaped glass body and exposing said glass body to a temperature between about 650°–850° C. for a sufficient length of time to cause crystallization of the mullite and rutile in said glass body; and then
   (d) cooling the crystallized body to room temperature.

2. A method according to claim 1 wherein said time sufficient to cause crystallization is at least about two minutes.

3. A method according to claim 1 wherein said batch also contains up to 2% $As_2O_5$ and/or up to 5% CaO and/or up to 5% $Na_2O$ and/or $K_2O$.

4. A method according to claim 3 wherein $As_2O_5$, $B_2O_3$, CaO, and $Na_2O$ are present in the mole ratio of $1As_2O_5$, $4B_2O_3$, 3CaO, and $3Na_2O$.

5. A method according to claim 1 wherein said batch consists essentially, by weight on the oxide basis as calculated from the batch, of about 6–12% MgO, 18–25% $Al_2O_3$, 2–4% $B_2O_3$, 35–50% $SiO_2$, 10–12% $TiO_2$, and 8–12% F.

6. A method according to claim 1 wherein said crystallized body is cooled to room temperature by means of a quick chilling technique to thermally temper said body.

* * * * *